US007651243B2

(12) United States Patent
McGuire, Jr. et al.

(10) Patent No.: US 7,651,243 B2
(45) Date of Patent: Jan. 26, 2010

(54) PHOSPHOR WHEEL ILLUMINATOR

(75) Inventors: James P. McGuire, Jr., Pasadena, CA (US); William J. Cassarly, Wooster, OH (US)

(73) Assignee: Optical Research Associates, Pasadena, CA (US)

( * ) Notice: Subject to any disclaimer, the term of this patent is extended or adjusted under 35 U.S.C. 154(b) by 31 days.

(21) Appl. No.: 11/448,599

(22) Filed: Jun. 7, 2006

(65) Prior Publication Data

US 2007/0019408 A1 Jan. 25, 2007

Related U.S. Application Data

(60) Provisional application No. 60/688,196, filed on Jun. 7, 2005.

(51) Int. Cl.
*F21V 9/00* (2006.01)
*G02B 5/28* (2006.01)

(52) U.S. Cl. ........................ 362/293; 362/280; 359/589

(58) Field of Classification Search ......... 362/166–170, 362/231, 277–284, 293, 319–325, 232; 359/359, 359/589, 590, 722, 723, 885, 891, 892; 353/84
See application file for complete search history.

(56) References Cited

U.S. PATENT DOCUMENTS 2,215,900 A 9/1940 Bitner
2,416,301 A * 2/1947 Goldmark ................... 348/743
2,681,946 A 6/1954 Leverenz
3,436,729 A * 4/1969 Zurcher ...................... 340/982
3,706,968 A * 12/1972 Turner, Jr. ................... 340/982
3,923,381 A 12/1975 Winston
4,996,632 A * 2/1991 Aikens ....................... 362/560
5,855,428 A * 1/1999 Wilkins ...................... 362/293
5,969,868 A * 10/1999 Bornhorst et al. ........... 359/589
6,139,174 A * 10/2000 Butterworth ................ 362/555
6,259,103 B1 7/2001 Pressnall
6,547,423 B2 4/2003 Marshall et al.
6,709,124 B2 * 3/2004 Magarill et al. ............... 362/35
6,796,685 B1 * 9/2004 Nemirow .................... 362/293

(Continued)

FOREIGN PATENT DOCUMENTS

JP 2004-341105 12/2004

OTHER PUBLICATIONS

X. Ning, R. Winston, J. O'Gallagher, Dielectric totally internally reflecting concentrators, 1987, 300-305, Applied Optics vol. 26, No. 2.

(Continued)

*Primary Examiner*—Ismael Negron
*Assistant Examiner*—David R Crowe
(74) *Attorney, Agent, or Firm*—Knobbe, Martens, Olson & Bear, LLP

(57) ABSTRACT

Various embodiments described herein comprise illuminators comprising a phosphor color wheel for producing colored light. Light of a first wavelength emitted by a light source is incident on a phosphor color wheel comprising a plurality of different regions, where at least one of these regions comprises a phosphor that fluoresces at a second wavelength when illuminated with light of the first wavelength. The light from the light source and the different regions of the phosphor color wheel are movable with respect to each other such that as the different regions are illuminated by the light, different colors are produced.

39 Claims, 10 Drawing Sheets

500
220
530
230
110
520
510

U.S. PATENT DOCUMENTS 6,819,505 B1 11/2004 Cassarly et al.
6,830,342 B2 * 12/2004 Lee ............................ 353/84
7,006,310 B2 * 2/2006 Karube et al. ............... 359/891
7,044,625 B2 * 5/2006 Chang et al. ................ 362/601
7,070,300 B2 * 7/2006 Harbers et al. .............. 362/231
7,084,405 B1 * 8/2006 Malyutenko et al. ... 250/370.08
7,116,378 B1 * 10/2006 McDonald .................. 348/743
7,148,497 B2 * 12/2006 Gardner ................... 250/503.1
2001/0053073 A1 * 12/2001 Itoh et al. ..................... 362/31
2002/0054031 A1 5/2002 Elliott et al.
2003/0218880 A1 * 11/2003 Brukilacchio ............... 362/293
2004/0001341 A1 1/2004 Chang et al.
2004/0145312 A1 * 7/2004 Ouderkirk et al. ........... 313/512
2005/0017990 A1 1/2005 Yoshida
2005/0068505 A1 3/2005 Momose et al.
2005/0082990 A1 4/2005 Elliott et al.
2007/0024971 A1 2/2007 Cassarly et al.

OTHER PUBLICATIONS

L. J. Hornbeck, Digital Light Processing For High-Brightness, High-Resolution Applications, Texas Instruments, Feb. 1997.
Matthijs H. Keuper, RGB LED Illuminator for Pocket-Sized Projectors, SID 04 Digest, 2004, 943-945.
D. Nesterenko, J. H. Min, and H. Y. Choi, Desing and Analysis of Tapered Waveguides as Collimators for LED Backlighting, SID 05 Digest, 2005, 1388-1391.
W.T. Welford and R. Winston, High Collection Non-Imaging Optics, 1989, 57, Academic Press, New York.
R. Winston, J. C. Minano, P. G. Benitez, Nonimaging Optics, 2005, 203, Elsevier Academic Press, Oxford.
International Search Report For PCT/US06/21963—Feb. 29, 2008.
Written Opinion Of International Searching Authority For PCT/US06/21963—Feb. 29, 2008.
International Preliminary Report on Patentability for PCT/US06/21963, dated Apr. 9, 2009.

* cited by examiner

PHOSPHOR WHEEL ILLUMINATOR

CROSS-REFERENCE TO RELATED APPLICATIONS

This application claims priority under 35 U.S.C. § 119(e) to U.S. Provisional Application Ser. No. 60/688,196 filed on Jun. 7, 2005 and entitled "Phosphor Wheel Illuminator", which is incorporated herein by reference in its entirety.

BACKGROUND

1. Field of the Invention

Certain embodiments disclosed herein relate generally to the field of illuminators and more particularly to phosphor wheel illuminators for use, for example, in display systems.

2. Description of the Related Art

It is common practice in some projection display systems to use one or more white light sources in combination with filter color wheels to produce a full color image. A typical color wheel is made up of a series of color filters such as absorption filters or interference filters. Color light is produced by passing white light produced by the white light source through the color filters to create a colored light. A full color image is produced by spinning the color wheel to sequentially produce different colored light which is directed to a spatial light modulator that sequentially varies as well.

Because the white light is filtered by the color filters, only a fraction of the light produced by the white light sources is transmitted through the color wheel. The other wavelengths are absorbed or reflected and not transmitted. Thus, a large portion of the light produced by the light sources is lost in display systems that utilize conventional color wheels.

What is needed, therefore, is a color wheel for producing colored light that is more efficient.

SUMMARY

In certain embodiments a multi-color lighting apparatus comprises a first light source configured to emit light having a first wavelength and a wavelength conversion element comprising a plurality of different regions. At least one of the regions of the wavelength conversion element comprises a phosphor that fluoresces at a second wavelength when illuminated with light of the first wavelength. The light from the first light source and the different regions of the wavelength conversion element are movable with respect to each other such that different colors are produced as the different regions are illuminated by the light.

In certain embodiments, a multi-color illumination apparatus comprises a phosphor color element comprising a plurality of different phosphor regions that fluoresce at different wavelengths, and an actuator connected to the phosphor color element which is configured to move the phosphor color element such that the different phosphor regions can be illuminated by a light at different times.

BRIEF DESCRIPTION OF THE DRAWINGS

For a more complete understanding of various preferred embodiments of the present invention and for further features and advantages, reference is now made to the following description taken in conjunction with the accompanying drawings.

DETAILED DESCRIPTION OF CERTAIN PREFERRED EMBODIMENT

Figure 1:
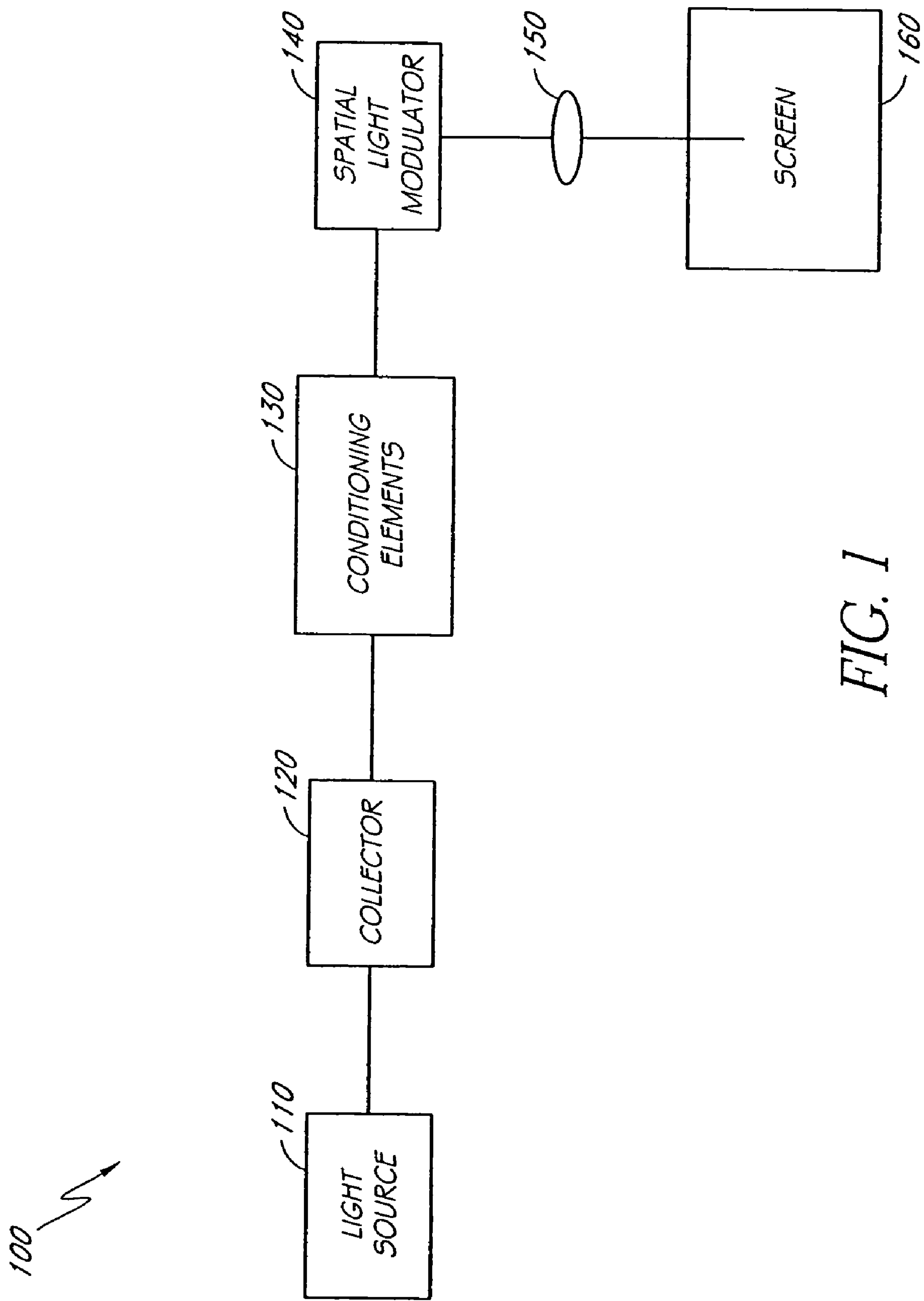
FIG. 1 is a schematic block diagram of a display apparatus.

FIG. 1 is a block diagram of a display apparatus 100. The apparatus 100 includes a light source 110, a collector 120, conditioning elements 130, a spatial light modulator 140, projection optics 150, and a screen 160.

The collector 120 may comprise one or more lenses that collect and transfer light emitted by the light source 110 to the conditioning elements 130. The conditioning elements 130 may include a variety of one or more light conditioning components, such as mixers and/or other components that condition the light, e.g. increase the homogeneity of the light.

The spatial light modulator 140 generally includes a plurality of pixels that can be independently activated to produce an image. The modulator 140 can be any of the variety of spatial light modulators known in the art (e.g., DMD, LCD, DLP, LCOS, or GLV) or yet to be developed. The projection optics 150 may comprise one or more optical lenses or elements that can be used to project an image formed by the spatial light modulator on the screen 160 or directly to a viewer's eye. The screen 160 can be any of a variety of devices or surfaces on which an image can be displayed. Such displays may include, for example, a computer monitor, TV screen, head or helmet mounted display, and more. As will be understood by those skilled in the art, additional components and other configurations for the display apparatus 100 are also possible. For example, a color producing device may be used to produce light with colors different than the color of the light produced by the light source 110.

Figure 2:
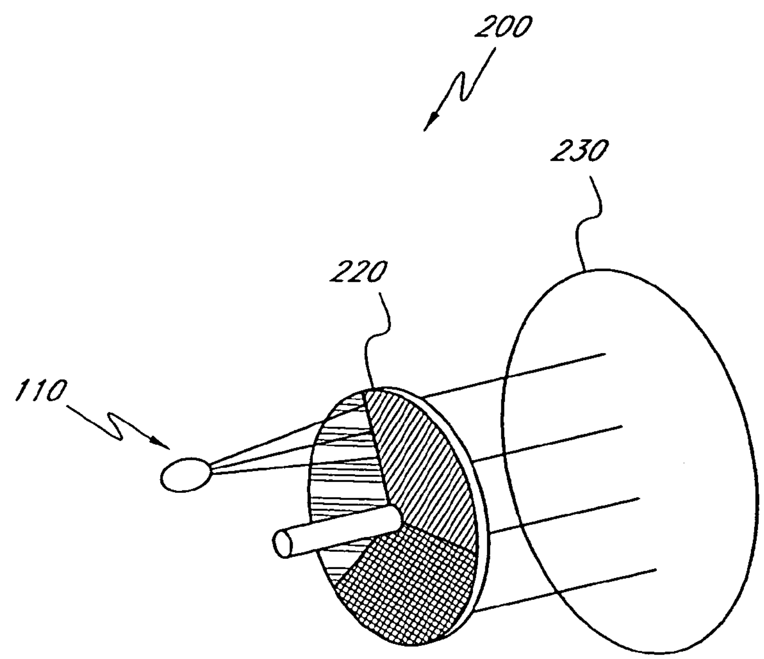
FIG. 2 is a schematic illustration of a phosphor wheel illuminator.

FIG. 2 is a diagram of a phosphor wheel illuminator 200 in accordance with an embodiment of the present invention. As illustrated in FIG. 2, before being directed to a collector 230, the light emitted by the light source 110 may go through a phosphor color wheel 220. In some arrangements, the light source 110 comprises a combination of light-producing devices, such as one or more LEDs. The light source 110 may comprise any suitable light-producing device, such as one or more fluorescent lamps, halogen lamps, incandescent lamps, discharge lamps, light emitting diodes, laser diodes or other times of light sources. In various preferred embodiments, the light source 110 comprises a suitable light-producing device that produces high energy (shorter wavelength) light, that is capable of exciting a phosphor. Such devices may for example produce ultraviolet (UV) or blue light and excite phosphors that produce visible light therefrom.

The phosphor color wheel 220 is an example of a wavelength conversion component with different spatial regions having different material compositions. At least one of the different regions that form the wheel 220 includes substances that cause the illuminator to output light characterized by a color or wavelength distribution. Such materials include, but are not limited to, phosphors. As will be understood by a person of ordinary skill in the art, phosphors are materials that exhibit photoluminescence. Other materials, such as substances that exhibit fluorescence and/or phosphorescence may also be used.

Thus, in accordance with a preferred embodiment of the present invention, the phosphor color wheel 220 is generally made of one or more layers of phosphor coated on different spatial regions of a transparent material such as glass or plastic. The layers coated on different spatial regions of the transparent material may comprise different phosphors or different mixtures of phosphors or other materials. In some embodiments, one or more of the spatial regions may include layers formed from materials other than phosphor. For example, one or more of the regions may comprise dichroic filters, absorption filters, interference filters, transparent regions with no color modifying properties, etc. The various spatial regions of the phosphor color wheel 220 can be of same or different sizes and/or shapes. The color wheel 220 may also include multiple separated regions that have the same phosphor.

Although a phosphor color wheel 220 is shown in FIG. 2, wavelength conversion elements comprising phosphor may have different shapes and be configured to move in a different manner other than being rotated. Some examples of different wavelength conversion elements comprising phosphor are illustrated in FIGS. 3A-3C.

Figure 3C:
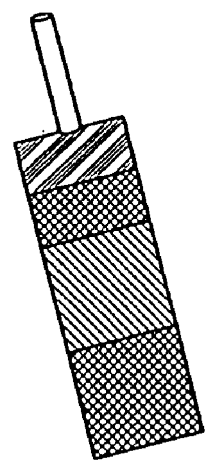
FIGS. 3A-3C schematically illustrates some exemplary shapes for the phosphor wavelength conversion elements.
Figure 3B:
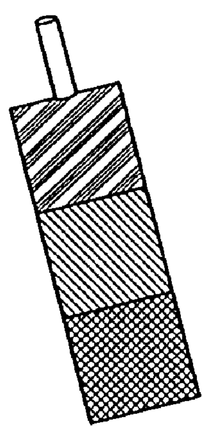
Figure 3A:
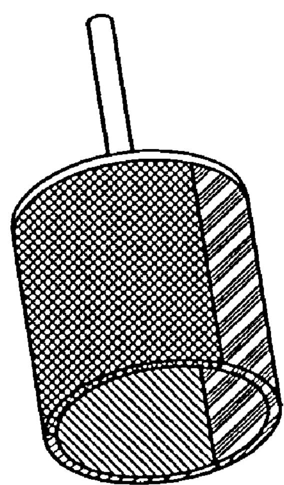

FIG. 3A, for example, shows a cylinder that rotates about a longitudinal axis extending therethrough. The cylinder includes a plurality of elongate regions extending parallel to the longitudinal axis of rotation of the cylinder. One or more of these elongate regions may comprise a phosphor for producing light. In various preferred embodiments, the elongate regions may be different. For example different regions may comprise different phosphor compositions to yield different color light. Other variations are also possible.

FIG. 3B shows a strip that translates. The strip includes a plurality of regions disposed sequentially along the direction of translation. One or more of these regions may comprise a phosphor for producing light. In various preferred embodiments, the regions may be different. For example different regions may comprise different phosphor compositions to yield different color light. Other variations are also possible. The strip in FIG. 3B has three regions and may correspond to a wavelength conversion element that produces red, blue, or green light or cyan, magenta, and yellow light, for example.

FIG. 3C shows a strip that has more regions. In particular, the strip shown in FIG. 3C has four regions. At least one of these regions comprises phosphor. These regions may be configured to produce different colors. In some embodiments, for example, the four different regions may produce four different colors respectively.

In some embodiments all the different regions comprise phosphor. For example, the wavelength conversion element such as the phosphor color wheel 220 shown in FIG. 2 may comprise three different spatial regions, each of which is coated with a different phosphor composition. These three different phosphor regions each produce a different color light, for example, red, green, and blue or cyan, magenta, and yellow, or other colors. Thus, when the higher energy (shorter wavelength) photons emitted by the light source 110 are incident on one of the spatial regions of the phosphor wheel 220, color lights of red, blue, or green may be produced via photoluminescence, fluorescence, or phosphorescence.

In certain embodiments, for example, the high energy photons incident on the phosphor material of the wheel 220, excite electrons in the phosphor to higher states. Subsequent to excitation, the electrons enter relaxed states of lower energy and in the process release photons. These photons generally have lower energy and longer wavelength than those used to excite the electrons. In certain embodiments, the light source and the phosphor are selected so as to produce visible light emission. Depending on the kind of phosphor, the visible light produced by the phosphor may be of various colors. In particular, the light emitted by the phosphor has a wavelength distribution that contains wavelengths different from that incident thereon,and the emitted wavelength distribution has a characteristic color in some embodiments. As described above, different regions of the color wheel 220 may have different phosphor compositions and thus produce different colored light when light from the light source is incident thereon. In some preferred embodiments, for example, as the color wheel spins, different regions are exposed to the light from the light source thereby producing different color light.

In some embodiments, a phosphor wheel illuminator may include a blue light source for illuminating the phosphor color wheel. The color wheel may comprise of three different regions each producing a different color light. For example, the color wheel may comprise a first region which is comprised of materials that are substantially non-fluorescing, and second and third regions which are comprised of phosphors that fluoresce to produce green, and red colored light respectively when illuminated with blue light from the light source. In certain embodiments, a white light source may also be used in which case the phosphor color wheel may produce infrared light. This configuration is particularly useful for military applications in which case the infrared light can be seen at night by people wearing night vision devices.

Although one or more of the regions may comprise a color filter such as an absorption filter or an interference filter, phosphors may be used. As described above, absorption or interference filters have reduced efficiency in comparison to phosphor, because absorption or interference filters pass only a portion of light incident thereon, the rest, for example, being absorbed or reflected. In contrast, phosphor may have an efficiency of about 90%, e.g., about 90% of the light incident thereon being converted into longer wavelengths. Accordingly, because of the high efficiency of phosphor, most of the light from the light source 110 is converted into color light. As a result, brighter color may be produce. Also, a lower power light source may be used thereby providing reduced energy consumption.

The wavelength conversion element may comprise an actuator for moving the different regions with respect to the light from the light source. For example, the phosphor wheel illuminator 200 shown in FIG. 2 may include a wheel motor (not shown) or other device that rotates the color wheel. This motor may control the speed at which the color wheel 220 spins. In a display or light projecting device, the spatial light modulator may be synchronizes with the movement of the wheel according to the format and color of the images (e.g., video images) received. Other types of actuators may also be used to move the wavelength conversion element.

In the illuminator 200 shown in FIG. 2, the light emitted by the phosphor color wheel 220 is collected by the collector 230. The collector 230 may include one or more lenses or other optical elements that collect and transfer the light that exits the phosphor color wheel 220 to other components in the display system. The collector 230 may also include homogenizing elements to improve uniformity. In certain configurations, the collector 230 may be a refractive/TIR lens; see, e.g. U.S. Pat. No. 2,215,900, filed Oct. 29, 1939; and entitled "Catadioptric lens" and U.S. Pat. No. 6,819,505, filed Sep. 8, 2003; and entitled "Internally Reflective Ellipsoidal Collector with Projection Lens", the entire contents of which are hereby incorporated by reference herein and made a part of this application.

In other embodiments, the collector 230 may include one or more dielectric and air filled Compound Parabolic Concentrators (CPCs). CPCs are well known in the art and are described in U.S. Pat. No. 3,923,381, file Dec. 28, 1973, entitled "Radiant Energy Collection", the entire contents of which is hereby incorporated by reference herein and made a part of this application. Additional examples of CPCs are described by Roland Winston, Juan C. Minano, G. Benitez in "Nonimaging Optics," *Academic Press*, Dec. 22, 2004. Other imaging and non-imaging optics may be used as well. In yet other embodiments, combinations of non-imaging and imaging collection optics may be used to reduce the length of the collector 230. One such collector is the Dielectric Total Internally Reflecting Collector (DTIRC); see e.g. described by Ning, X. Winston, R. and O'Gallagher, J. in "Dielectric Totally Internally Reflecting Concentrators," *Applied Optics*, Vol. 26(2), pp. 300-305, Jan. 15, 1987, the entire contents of which is hereby incorporated by reference herein and made a part of this application.

In certain embodiments, the phosphor color wheel 220 is illuminated on a first side and light is emitted from a second side and is directed at the collector 230 which is placed in front of the second side of the color wheel 220. In particular, higher energy (shorter wavelength) light can be incident on one side and lower energy (higher wavelength) light may be emitted and collected on the other side of the phosphor color wheel 220 for output from the illuminator. In other embodiments, the phosphor wheel 220 can be illuminated from both sides. In other configurations, the phosphor layer may be dispersed within a relatively thick volume. These configurations result in angular distributions of the light source at the phosphor color wheel being larger than a hemisphere. The angular distribution of the light source at the phosphor color wheel may also exceed 1 steradian.

Figure 4:
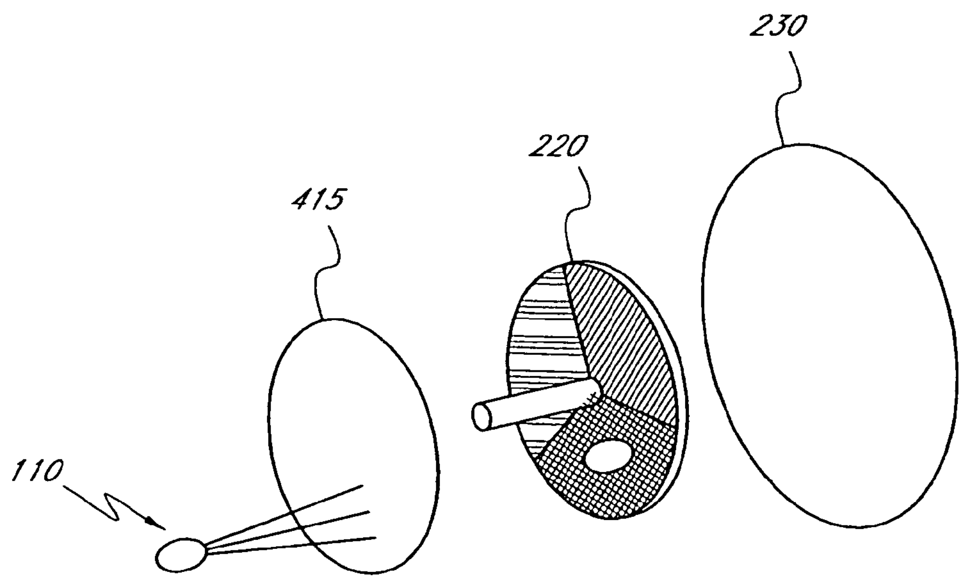
FIG. 4 is a schematic illustration of a phosphor wheel illuminator incorporating a relay lens.

A wide variety of configurations are possible. FIG. 4, for example, is a diagram of an alternative embodiment of a phosphor wheel illuminator 400 comprising additional optics disposed between the light source and the color wheel. In particular, in the phosphor wheel illuminator 400 of FIG. 4, the high energy light emitted from a light source 110 is directed towards relay optics 415. The relay optics 415 can be a transmissive lens which forms an image of the light source 110 on or near the phosphor color wheel 220. In some configurations, the relay optics 415 may also be combination of one or more transmissive lenses. In other embodiments, reflective, refractive, TIR, catadioptric, or diffractive optical elements can be used. After energy from the light source 110 is relayed on or near the phosphor color wheel 220, the phosphor color wheel 220 converts the high energy (shorter wavelength) light into low energy (longer wavelength) color light that exits the color wheel 220, and is collected and further transferred by the collector 230 to other components in the system. Although in certain embodiments the relay optics form an image of the output of the light source onto the phosphor color wheel, in other embodiments, optics disposed between the light source and the phosphor color wheel may not form an image of the light source on the color wheel. For example, defocus may be introduced. Alternatively, one or more non-imaging optical elements may be used.

Figure 5:
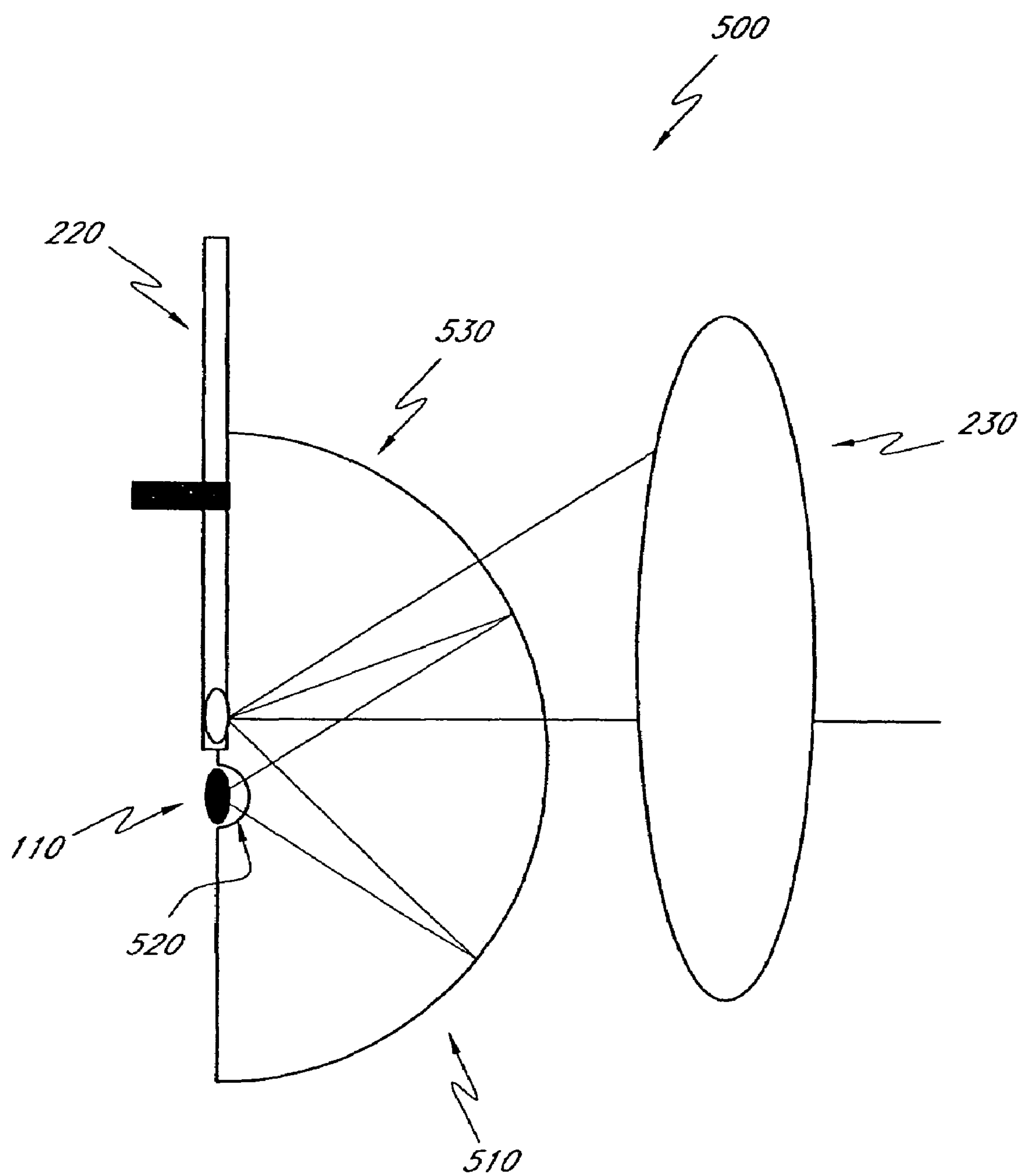
FIG. 5 is a schematic illustration of a phosphor wheel illuminator incorporating a hemispherical reflector.

FIG. 5 is a diagram of yet another alternative embodiment of a phosphor wheel illuminator. The phosphor wheel illuminator 500 of FIG. 5 includes a reflector 510, in addition to the light source 110, the phosphor wheel 220, and the collector 230. The reflector 510 can be a substantially optically transmissive optical element comprising, e.g., glass, having first and second curved surfaces thereon. The first surface may form a recess area 520 in the optical element in which the light source 110 is disposed. The second surface 530 may be coated with a coating that is reflective to higher energy (shorter wavelength) light such as UV light in cases where the light source 110 comprises a UV light source. The curved surface may have a spherical or ellipsoidal surface in some embodiments, although other shapes are possible. With the light source 110 placed behind the recess area 520, light emitted by the light source 110 reach the surface of the recess area 520 and is refracted by the recess area 520 which can act like a refractive lens surface. The refracted light then reaches the UV coated surface 530 which reflects the UV light onto the phosphor wheel 220. In certain embodiments, the second surface forms an image of the light source 110 on the phosphor wheel. The reflected UV light reaches the phosphor and causes the phosphor to emit colored light. The reflector 510 is made of material that is substantially optically transmissive to the color light emitted by the phosphor and directed towards the second surface 530. In certain preferred embodiments, however, the coating formed on the second surface is optically transmissive to the wavelength of light produced by the phosphor. Thus, the color light from the phosphor incident on the surface 530 generally is transmitted through the second surface 530 and refracted by the second surface 530. The color light passed through the optical element is then collected by the collector 230. In some embodiments, the first surface 520 has a curvature close to that of the second surface 530 and the separation between the two is small. The coating can be on either the inner or the outer side of the reflector 510. In the case where the reflector coating is on the first surface, the reflector 510 forms a hollow cavity. In this embodiment, the material between the first and second surfaces need not transmit high energy light from the light source.

It should be noted that although, the reflector 510 is described as a hemisphere or ellipsoidal, other shapes are also possible. Additionally, the optical element may comprise material other than glass that is substantially optically transmissive to the wavelength of light emitted by the light source and by the phosphor. In certain preferred embodiments, however, the coating on the second surface substantially reflects light emitted by the light source but is substantially optically transmissive to light radiated by the phosphor. Although the optical element of FIG. 5 is shown as re-imaging the light source onto the phosphor in other embodiments the light source need not be re-imaged on the phosphor. For example, defocus may be introduced such that a focus image of the light source is not formed on the phosphor. Also, the optical element may comprise non-imaging optical elements. Other configurations are possible.

Figure 6:
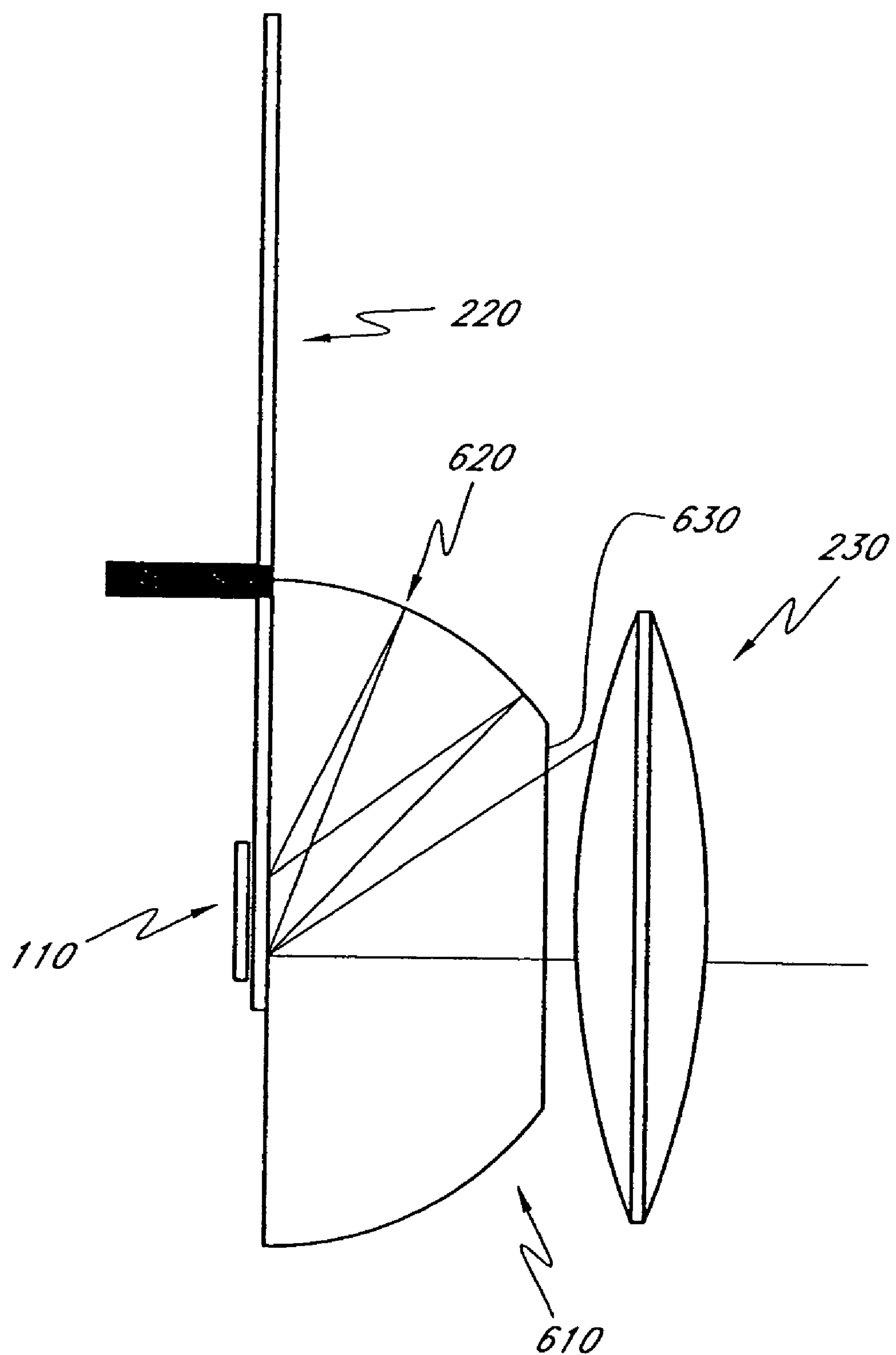
FIG. 6 is a schematic illustration of a phosphor wheel illuminator incorporating a light recycling element and collector lens.

Alternatively, a light recycling element can be used to direct some of the light that exits the phosphor wheel back onto the wheel, as illustrated in FIG. 6. As illustrated, the illuminating system 600 includes a light source 110, a phosphor wheel 220, a light recycling element 610, and a collector 230. The light recycling element 610 can have a curved reflecting surface such as a hemispherical reflector defining first and second optical apertures 630 through which light can pass. As illustrated, the light source 210 may be placed behind the phosphor wheel 220 and thus may direct light onto the phosphor wheel 220. The high energy (short wavelength) light incident on the phosphor wheel 220 generally results in emission of color light by the phosphor wheel 220. A portion of the color light emitted by the phosphor wheel 220 having a low angle with respect to an optical axis of the light recycling element enters through the first optical aperture of the light recycling element, propagates therethrough, and exits the second optical aperture 630. In certain embodiments, the second aperture 630 is generally sized and positioned such that most of the light that exits the second optical aperture is collected by the collector 230. In certain embodiments, the second aperture 630 reflects light emitted by the source but passes colored light emitted by the phosphor. The second optical aperture 630 may, for example, include a coating that reflects the light from the light source and transmits colored light produced by the phosphor. In contrast, light having a higher angle with respect to the optical axis is reflected by the hemispherical surface back onto the phosphor wheel 220. A portion of this optical energy directed back onto the phosphor wheel 220 is reradiated from the phosphor wheel at an angle so as to pass through the second optical aperture 630. Some light however will be directed once again at a higher angle such that the light is again incident on the reflective surface 620 and is again reflected back onto the wheel 220. This system achieves increased luminance and thus increased efficiency because the light that would otherwise exit the light recycling film 610 at angles that would not reach the collector 230 are now reflected back onto the wheel 220. A portion of this optical energy returned back to the phosphor may be redirected at suitable angles so at to pass through the collector 230. Accordingly, the optical element is referred to as a light recycling element as light that would otherwise be emitted from the phosphor at undesirable angles is recycled back to the phosphor and given the opportunity to be redirected within the desired angular range.

The light recycled back to the color wheel may include short wavelength light output by the light source that is transmitted through the phosphor without causing fluorescence (or phosphorescence) as well as the longer wavelength light emitted by the phosphor via fluorescence (or phosphorescence). Accordingly, in certain embodiments in addition to the color light that is radiated by the phosphor wheel and reaches the surface 620, there may also be some UV light that failed to excite electrons in the phosphor. This UV light may come in contact with the surface 620 and get reflected back onto the wheel 220 so as to be given another opportunity to induce fluorescence (or phosphorescence) in the phosphor thereby creating longer wavelength light. This recycling further increases the efficiency of the illuminator 600. In an alternative embodiment, structured light recycling films (e.g. brightness enhancement films) may be placed in front of or over the phosphor or be integrated onto the phosphor wheel to provide recycling and increase luminance.

In some embodiments, the phosphor wheel may be substantially flat, however, to improve extraction of photons from the color wheel, e.g. the substrate, may be textured any may comprise optical features thereon or therein. The textures may be features that are larger than the wavelength of the source and there may take the shape of pyramid arrays, lenslet arrays, or other shapes. The textures may also be smaller than the wavelength of light. These may include photonic lattices or photonic crystals.

Figure 7:
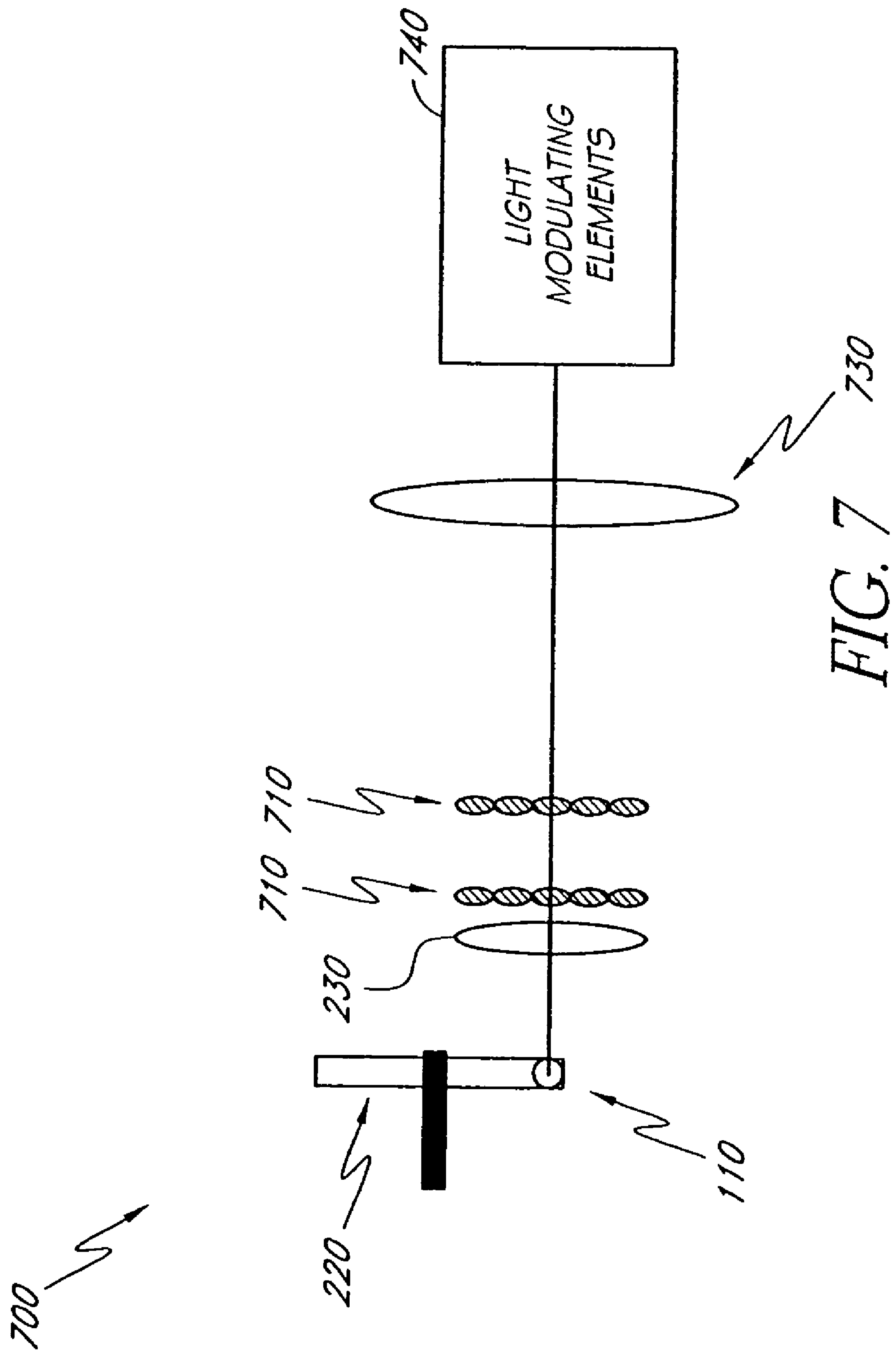
FIG. 7 is a schematic illustration of a display apparatus comprising a phosphor wheel illuminator that includes fly's eye lens elements used for beam homogenization.

FIG. 7 illustrates one of the many illumination systems that may include a phosphor wavelength conversion element such as described above. In these embodiments, homogenizing elements are used in the illuminator system. In particular, the light projecting apparatus 700 includes a phosphor wheel 220, a collector 230, fly's eye lens elements 710 and 720, an imaging lens 730, and light modulating elements 740. The fly's eye lens elements 710 and 720 are positioned so as to mix the light from the phosphor color wheel that is collected by the collector. In certain preferred embodiments, the spatial and/or angular distribution of light may be made more uniform with the fly's eye lenses 710 and 720. Lens 730 receives this substantially homogenized light and passes this light onto the light modulator 740.

In various preferred embodiments, the image formation device comprises a plurality of pixels that can be separately activated to produce an image or symbol (e.g., text, numbers, characters, etc). The plurality of pixels may comprise a two-dimensional array. This image formation device may be in an object field that is imaged by imaging optics not shown in FIG. 7. An image of the image formation device, for example, may be formed at a finite or infinite distance away in some embodiments and may be a virtual image in some embodiments. Other configurations are also possible.

Figure 8:
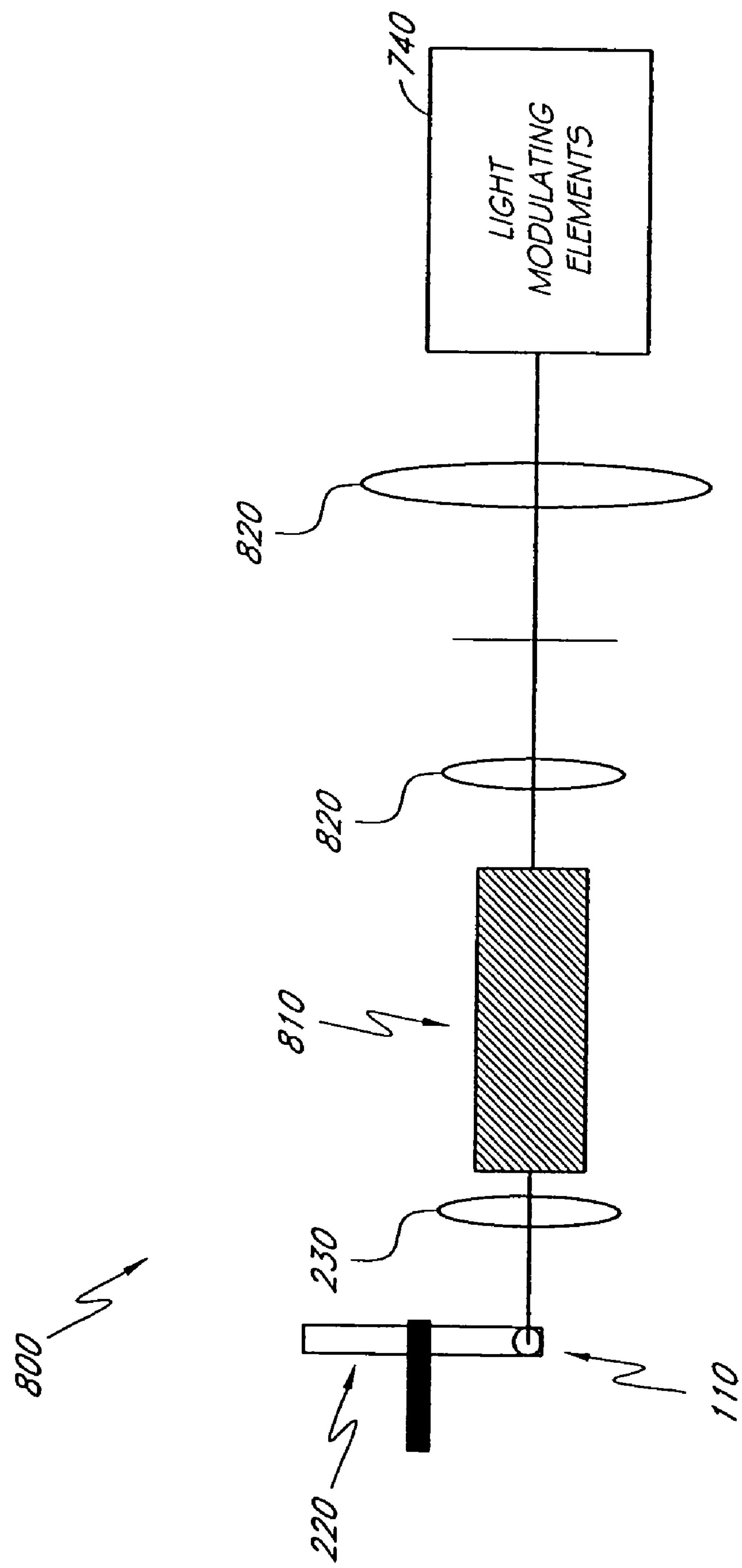
FIG. 8 is a schematic illustration of a display apparatus comprising a phosphor wheel illuminator that includes an integrating rod for beam homogenization.

FIG. 8 is a schematic diagram of another embodiment of a phosphor wheel illuminator utilizing a homogenizing element. The light projecting apparatus 800 includes a phosphor wheel 220, a collector 230, an integrating rod 810, relay lenses 820, and light modulating elements 830. Examples of integrating rods 810 are included in U.S. patent application Ser. No. 11/441,807, entitled "Rippled Mixers for Uniformity and Color Mixing" filed May 26, 2006 which is incorporated herein by reference in its entirety. Other configurations and designs are possible.

Figure 9:
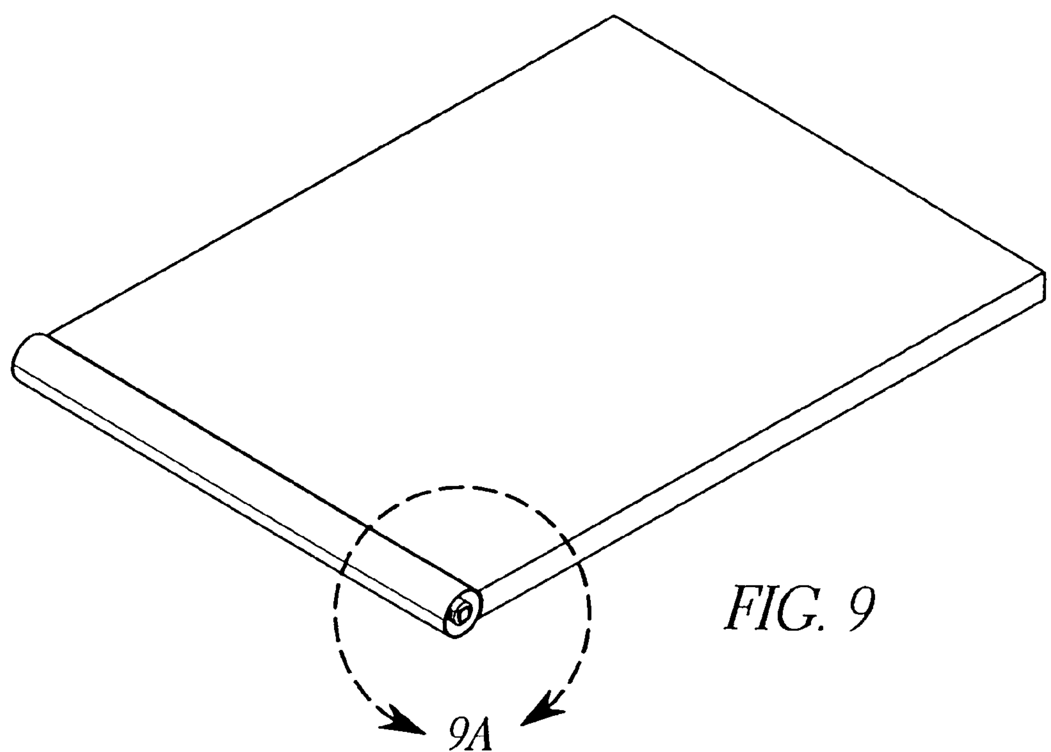
FIGS. 9 and 9A illustrate the use of a phosphor wheel illuminator in a blacklight panel device.
Figure 9A:
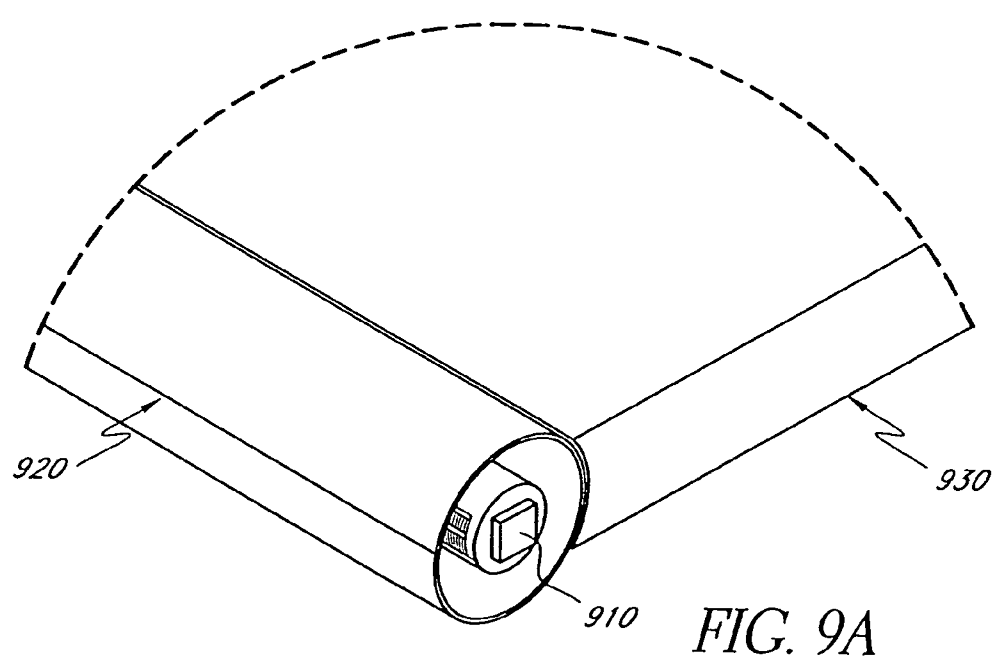

FIG. 9 is a diagram of a phosphor wavelength conversion element used in a backlight panel. As illustrated in FIG. 9A, the illuminator system 900 includes a light source 910, an elongate light pipe, a phosphor wavelength conversion element 920, and a light panel 930. The light source 910 comprises an emitter such as an LED. The light emitter 910 is disposed with respect to the elongate light pipe to couple light therein. In the embodiment shown the elongate light pipe generally comprises a cylindrically shaped conduit suitable guiding light therein. The light pipe shown in FIG. 9A has the shape of a right circular cylinder, although other shapes are possible. This light pipe may be hollow or solid. Light injected into the light pipe may be ejected therefrom in some embodiments in a controlled manner using ejection elements. Reflective films or other reflective surfaces may also be used to control the direction of light ejected from the light pipe.

The light pipe is disposed inside the cylindrically shaped phosphor wavelength conversion element 920 which is configured to be rotated about the light pipe. As described above with reference to FIG. 3A, such a cylindrically shaped wavelength conversion element may include a plurality of regions at least one of which comprises phosphor. Light from the different regions may be of different color.

In various preferred embodiments, the light pipe may be configured (e.g., may include ejector elements) so as to eject light therefrom toward an edge of the light panel 930. This light may pass through the wavelength conversion element 920 prior to reaching this edge of the light panel 930. Accordingly, as shown in FIG. 9A, the light panel 930 is disposed with respect to the cylindrical phosphor wavelength conversion element and elongate light pipe such that light ejected from the elongate light pipe is passed through a portion of the cylindrical phosphor wavelength conversion element and light from the wavelength conversion element is injected into an edge of the light panel 930.

Light injected into the light panel is guided therein and ejected from a face thereof. The light panel 930 may include extractors which cause the light to be ejected from this face and may be arranged to distribute extracted light evenly across the face.

As described above, the cylindrically shaped wavelength conversion element 920 may be rotated such that light from the light pipe is passed through different regions of the wavelength conversion element to produce different colors at different times. This different colored light is injected into the light panel 930 and output therefrom. Accordingly, different color light may be output from the light panel 930 at different times. The modulation of color with time may be synchronized with a spatial light modulator disposed with respect to the light panel to be illuminated therefrom. This spatial light modulator may be varied to produce color images. Other configurations are also possible.

Figure 10A:
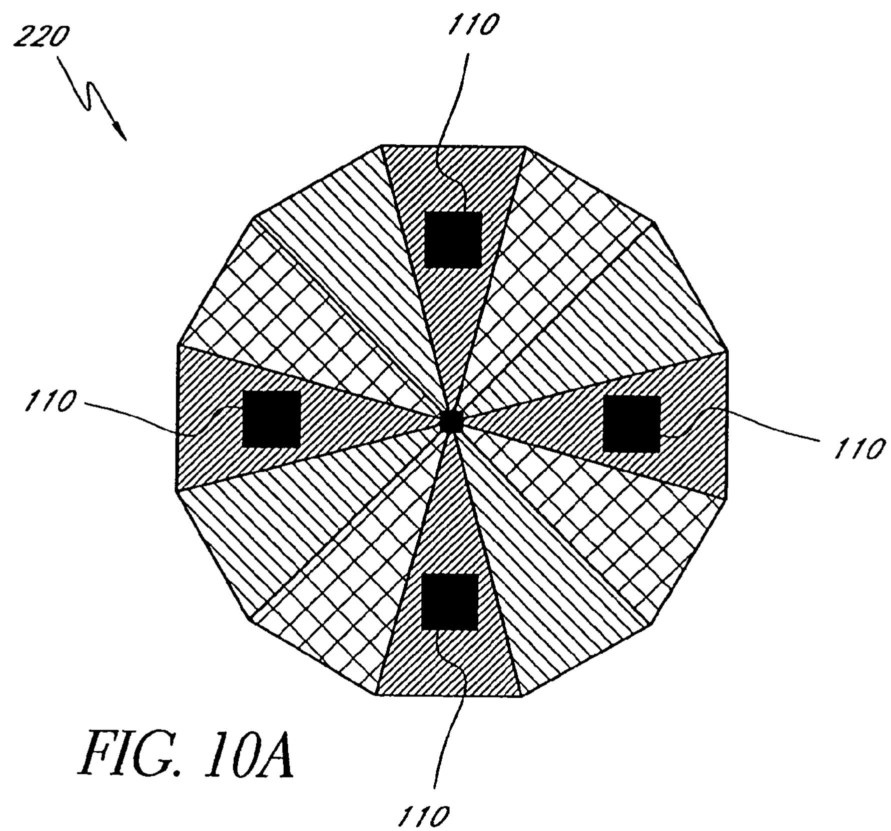
FIGS. 10A-10C schematically illustrate the use of four light sources with a phosphor color wheel.
Figure 10B:
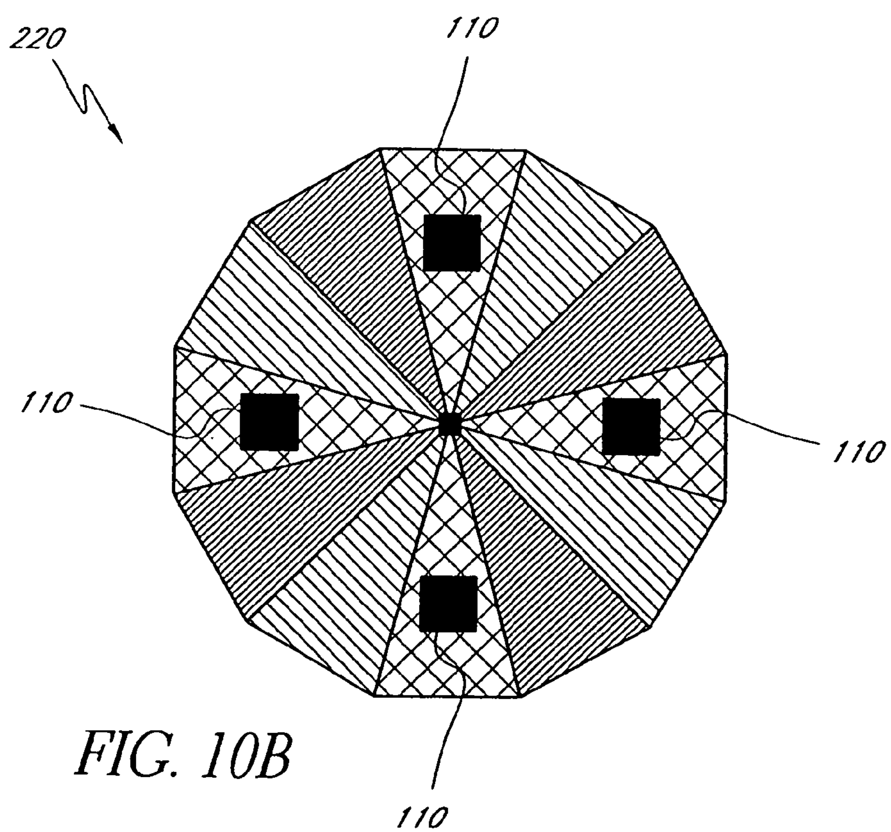

A variety of other configurations are possible. For example, as illustrated in FIGS. 10A-10B, four light sources can be used to illuminate the phosphor wheel 220. The light sources 110 may be arranged such that each source is aligned with a different region of the phosphor color wheel 220, when the wheel is in one position. As illustrated in FIGS. 10A and 10B the different regions with which the light sources are aligned may be comprised of the same composition. This can allow the phosphor wheel to be moved such that the output color varies, but all sources produce the same color. In certain embodiments, the color wheel 220 can have repeated red, green, blue regions. Four light sources may be placed such that each light source is aligned with a different region having the same color. Rotating the wheel in this case can change the color of all sources simultaneously. In certain embodiments, illuminators using this approach could be inserted into conventional light bulb sockets to provide variable lighting.

Figure 10C:
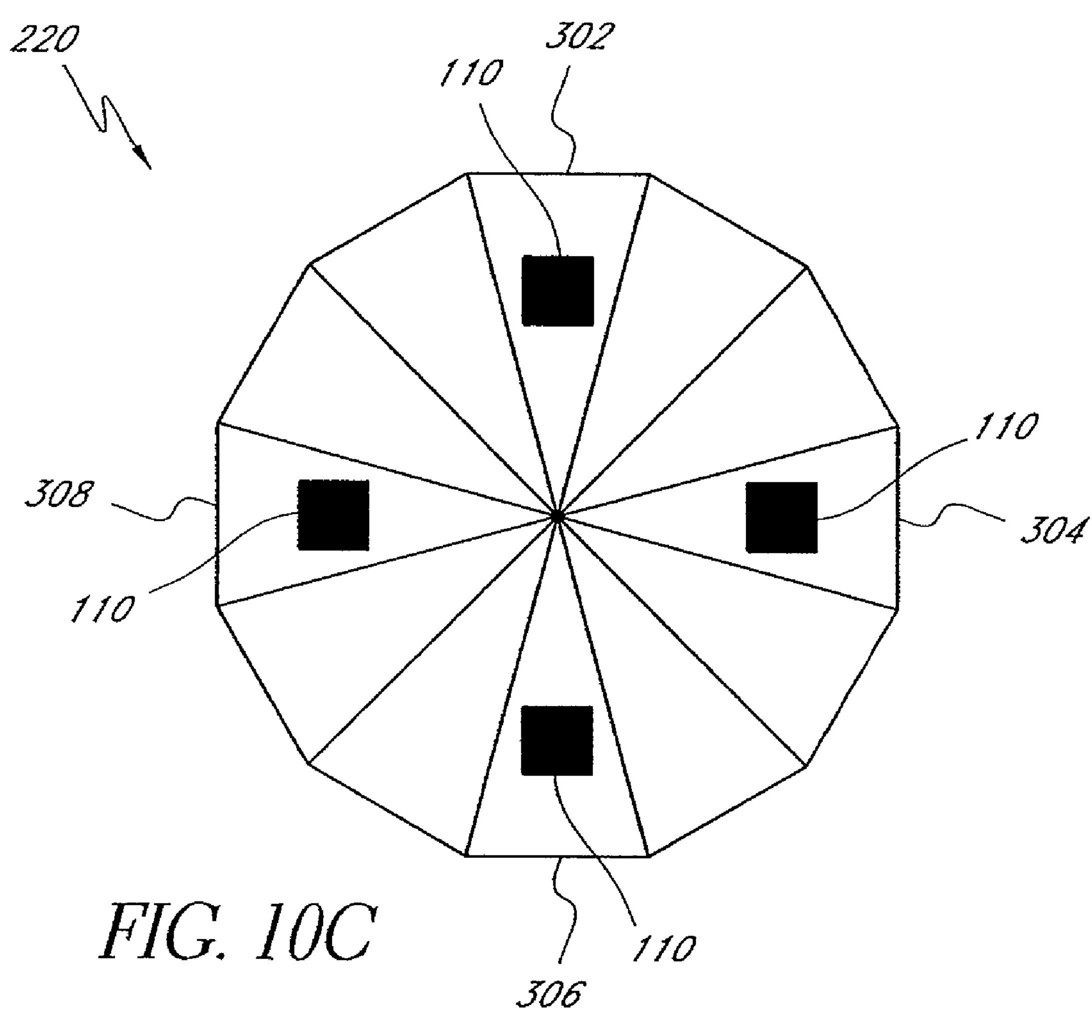

In certain embodiments, the light sources can be arranged such that they are aligned with different regions that provide different colors. Thus, four light sources 110 can, for example, be arranged such that they are each aligned with a different region 302, 304, 306, and 308 of a phosphor color wheel 220 of a different color (see. e.g., FIG. 10C). There generally is also a lot of interest in having light sources where the color is varied during the day to simulate typical outside lighting conditions. The phosphor color wheel can provide such capabilities by using discrete regions with different color phosphors so that illuminating multiple regions simultaneously gives the desired average color. The color wheel can be rotated to a different position to provide a different color.

In certain configurations, there may be a gradient in phosphor composition and color output across one or more regions of the phosphor color wheel. In other configurations, there may be a gradient across the entire phosphor color wheel. The wheel, for example, can be patterned such that as the wheel is moved, different relative fractions of colors are produced, thereby creating different colors. Such configuration can be used to provide different lighting conditions for example, a variable color temperature. In certain embodiments, a discrete region can use a phosphor blend to produce a desired color temperature, and the blend can vary spatially across the phosphor wheel. A continuous spatial variation in the blends, rather than discrete regions with different blends, can be used to ensure that the color or color temperature varies smoothly as a function of spatial position on the phosphor wheel and that imaging the phosphor does not produce noticeable discontinuities in the color.

As discussed above, other designs may be used as well. The optical designs provided herein are merely examples and are not limiting. For example, variations in the number, shape, thickness, material, position, and orientation of the optical elements, are possible. Holographic or diffractive optical elements, refractive and/or reflective optical elements can be employed in a variety of arrangements. Different types of light sources, wavelength conversion element, beam conditioning optics, collecting optics, and/or other optics may also be used. Many other variations are possible and the particular design should not be limited to the exact designs included herein.

For example, the light source may comprise one or more light emitters but can also include other optical and mechanical packaging elements, such as protective overcoating, reflector, phosphor, etc. Other configurations are also possible.

A wide variety of approaches may be used to deliver light from the light source to the wavelength conversion element and from the wavelength conversion element to the spatial light modulator. Optics for transferring light from the light source to the phosphor wavelength converting element can include integrating cavity, light pipe, conventional relay optics, nonimaging relay optics, etc. In some embodiments, no optical elements are disposed between the light emitter and the wavelength converting element nothing (e.g., thin air gap may be disposed therebetween). The illuminator can further include recycling optics (e.g., prismatic film), dichroic coating (e.g., coating to reflect source wavelengths but transmit luminescent wavelengths), etc. The phosphor output coupler can include an angle-to-area converter, mixer, or complex optical assembly. Other optics may also be used. Similarly other configurations are possible.

The wavelength conversion element may be included in systems with different designs. For example, the wavelength conversion element may be included in display systems wherein different image formation devices may be used to produce the image. In some embodiments, for example, an array of organic light emitting diodes (OLEDS) may be used. This type of image formation device is emissive as the OLEDS produce light. Different types of spatial light modulators may also be employed. In some embodiments, the different pixels in spatial light modulators may be illuminated by separate light sources. Other designs are also possible.

Certain embodiments disclosed herein may be used in numerous applications. For example, phosphor illuminators may be used to substantially uniformly illuminate a spatial light modulator (e.g., DLP, LCOS, GLV, LCD) in a display, such as a micro-display, a front/rear projector, a heads-up displays, head-mounted and helmet-mounted displays, television, computer screens, screens for other devices such cell phones, personal organizers, etc. In addition, certain embodiments may be used for other lighting applications. In some embodiment, for example, the phosphor illuminators may enable spectral control over solid state, incandescent, and fluorescent lighting. Such illumination may be beneficial in commercial, industrial, consumer, and military applications. Embodiments may be used for architectural and landscape lighting, display case lighting, stage and studio lighting. These illumination systems may be used in spot lighting, flood lighting, wall washing lighting, signage, and other lighting applications. These illuminating systems may be included in portable lights such as flashlights. Other areas that can benefit from certain embodiments include lithography, biomedical sensing, and industries where beam patterns are regulated, such the automotive and aviation industries. Medical applications are also possible. In general, many lighting and lighting replacements may benefit from certain embodiments.

More generally, a wide variety of configurations are possible. For example, in different embodiments, features may be added, excluded, rearranged, or configured differently. In some embodiments, for example, the shapes, angles, dimensions, and/or number of features can be different than those disclosed herein.

Reference throughout this specification to "one embodiment" or "an embodiment" means that a particular feature, structure or characteristic described in connection with the embodiment is included in at least one embodiment. Thus, appearances of the phrases "in one embodiment" or "in an embodiment" in various places throughout this specification are not necessarily all referring to the same embodiment. Furthermore, the particular features, structures or characteristics of any embodiment described above may be combined in any suitable manner in one or more embodiments.

Similarly, it should be appreciated that in the above description of embodiments, various features of the inventions are sometimes grouped together in a single embodiment, figure, or description thereof for the purpose of streamlining the disclosure and aiding in the understanding of one or more of the various inventive aspects. This method of disclosure, however, is not to be interpreted as reflecting an intention that any claim require more features than are expressly recited in that claim. Rather, as the following claims reflect, inventive aspects lie in a combination of fewer than all features of any single foregoing disclosed embodiment. Thus, the claims following the Detailed Description are hereby expressly incorporated into this Detailed Description, with each claim standing on its own as a separate embodiment.

What is claimed is:

1. Multi-color illumination apparatus comprising:

at least a first light source;

a phosphor color element comprising a plurality of different phosphor regions that fluoresce at different wavelengths when illuminated with light from said first light source, an actuator connected to said phosphor color element to move said phosphor color element such that said different phosphor regions can be illuminated by light from said first light source at different times; and a recycling element that reflects light emitted by said phosphor element back to said phosphor element when said light emitted by said phosphor element is outside a range of angles and transmits light emitted by said phosphor element within said range of angles, said recycling element including an aperture that selectively reflects light emitted by said first light source and passes light emitted by said phosphor element.

2. The illuminating apparatus of claim 1, wherein said phosphor color element comprises a color wheel configured to rotate said different phosphor regions.

3. The illuminating apparatus of claim 1, wherein said phosphor color element comprises a cylinder that rotates said different phosphor regions.

4. The illuminating apparatus of claim 1, wherein said phosphor color element comprises first, second, and third regions, wherein the first region is substantially non-fluorescing, and the second and third regions are comprised of phosphors that fluoresce to produce green and red colored light when illuminated with said light from said first light source.

5. The illuminating apparatus of claim 4, wherein said first region is comprised of a clear region.

6. The illuminating apparatus of claim 1, wherein said phosphor color element comprises red, blue, and green regions that fluoresce so as to produce respective red, blue, and green colored light when illuminated with said light from said first light source.

7. The illuminating apparatus of claim 1, wherein said phosphor color element comprises three different regions.

8. The illuminating apparatus of claim 1, wherein said recycling element comprises a spherical or aspheric mirror having said aperture therein through which light from said phosphor element passes.

9. The illuminating apparatus of claim 1, wherein said first light source comprises an ultraviolet light source.

10. The illuminating apparatus of claim 1, wherein said first light source comprises a blue light source.

11. The illuminating apparatus of claim 1, wherein said first light source comprises a white light source.

12. The illuminating apparatus of claim 11, wherein said phosphor regions fluoresce to produce infrared light when illuminated with white light from said white light source.

13. The illuminating apparatus of claim 1, further comprising a mixer that homogenizes said light from said first light source.

14. The illuminating apparatus of claim 1, wherein at least one of said different regions comprises a gradient in phosphor composition.

15. The illuminating apparatus of claim 1, wherein said different regions comprise at least two adjacent regions that form a gradient in phosphor composition.

16. Multi-color lighting apparatus comprising:

a first light source configured to emit light that includes a first wavelength;

a wavelength conversion element comprising a plurality of different regions, at least one of said regions comprising a phosphor that fluoresces at a second wavelength when illuminated with light of said first wavelength; and an ellipsoidal shaped reflective element that substantially reflects said light of said first wavelength from said first light source onto said wavelength conversion element and transmits said light of said second wavelength produced by said phosphor;

wherein said light from said first light source and said different regions are movable with respect to each other such that different colors are produced as said different regions are illuminated by said light of said first wavelength.

17. The lighting apparatus of claim 16, wherein said light source comprises a UV light source and said reflective element includes a UV reflecting coating that is substantially optically transmissive to visible light.

18. The lighting apparatus of claim 16, wherein said first light source is disposed at a focus of said ellipsoidal shaped reflective element.

19. The lighting apparatus of claim 16, wherein said wavelength conversion element comprises red, blue, and green regions that fluoresce so as to produce respective red, blue, and green colored light when illuminated with said light from said first light source.

20. The lighting apparatus of claim 16, wherein said first light source comprises an ultraviolet light source.

21. The lighting apparatus of claim 16, wherein said first light source comprises a blue light source.

22. The lighting apparatus of claim 16, wherein said first light source comprises a white light source.

23. The lighting apparatus of claim 22, wherein said phosphor fluoresces to produce infrared light when illuminated with white light from said white light source.

24. The lighting apparatus of claim 16, further comprising a mixer that homogenizes said light from said first light source.

25. The lighting apparatus of claim 16, wherein at least one of said different regions comprises a gradient in phosphor composition.

26. The lighting apparatus of claim 16, wherein said different regions comprise at least two adjacent regions that form a gradient in phosphor composition.

27. Multi-color illumination apparatus comprising:

at least a first light source;

a phosphor color element comprising a plurality of different phosphor regions that fluoresce at different wavelengths when illuminated with light from said first light source, an actuator connected to said phosphor color element to move said phosphor color element such that said different phosphor regions can be illuminated by light from said first light source at different times;

a recycling element that reflects light emitted by said phosphor element back to said phosphor element when said light emitted by said phosphor element is outside a range of angles and transmits light emitted by said phosphor element within said range of angles, and an optical surface that selectively reflects light emitted by said first light source and passes light emitted by said phosphor element.

28. The illuminating apparatus of claim 27, wherein said phosphor color element comprises a color wheel configured to rotate said different phosphor regions.

29. The illuminating apparatus of claim 27, wherein said phosphor color element comprises a cylinder that rotates said different phosphor regions.

30. The illuminating apparatus of claim 27, wherein said optical surface comprises a coating disposed so as to receive light emitted by said phosphor element within said range of angles.

31. The illuminating apparatus of claim 27, wherein said first light source comprises an ultraviolet light source.

32. The illuminating apparatus of claim 27, wherein said first light source comprises a blue light source.

33. The illuminating apparatus of claim 27, wherein said first light source comprises a white light source.

34. The illuminating apparatus of claim 33, wherein said phosphor regions fluoresce to produce infrared light when illuminated with white light from said white light source.

35. The illuminating apparatus of claim 27, wherein said phosphor color element comprises red, blue, and green regions that fluoresce so as to produce respective red, blue, and green colored light when illuminated with said light from said first light source.

36. The illuminating apparatus of claim 27, further comprising a mixer that homogenizes said light from said first light source.

37. The illuminating apparatus of claim 27, wherein at least one of said different regions comprises a gradient in phosphor composition.

38. The illuminating apparatus of claim 27, wherein said different regions comprise at least two adjacent regions that form a gradient in phosphor composition.

39. The illuminating apparatus of claim 27, wherein said recycling element comprises a brightness enhancing film.

* * * * *

UNITED STATES PATENT AND TRADEMARK OFFICE

CERTIFICATE OF CORRECTION

PATENT NO. : 7,651,243 B2
APPLICATION NO. : 11/448599
DATED : January 26, 2010
INVENTOR(S) : McGuire, Jr. et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 234 days.

Signed and Sealed this

Twenty-eighth Day of December, 2010

David J. Kappos

*Director of the United States Patent and Trademark Office*